United States Patent
Heggebø

(10) Patent No.: US 12,351,404 B2
(45) Date of Patent: Jul. 8, 2025

(54) AUTOMATED STORAGE AND RETRIEVAL SYSTEM WITH A VEHICLE PEN

(71) Applicant: Autostore Technology AS, Nedre Vats (NO)

(72) Inventor: Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 646 days.

(21) Appl. No.: 17/753,808

(22) PCT Filed: Sep. 21, 2020

(86) PCT No.: PCT/EP2020/076301
§ 371 (c)(1),
(2) Date: Mar. 15, 2022

(87) PCT Pub. No.: WO2021/058434
PCT Pub. Date: Apr. 1, 2021

(65) Prior Publication Data
US 2022/0340364 A1    Oct. 27, 2022

(30) Foreign Application Priority Data

Sep. 25, 2019 (NO) .................................. 20191158
Jun. 30, 2020 (NO) .................................. 20200762

(51) Int. Cl.
*B65G 47/88*    (2006.01)
*A62C 3/00*    (2006.01)
(Continued)

(52) U.S. Cl.
CPC .......... *B65G 47/8884* (2013.01); *A62C 3/002* (2013.01); *B65G 1/04* (2013.01);
(Continued)

(58) Field of Classification Search
CPC ...... B65G 1/0464; B65G 1/04; B65G 1/0471; B65G 1/0485; B65G 1/06; B65G 1/065;
(Continued)

(56) References Cited

U.S. PATENT DOCUMENTS 3,964,577 A    6/1976   Bengtsson
4,789,293 A    12/1988  Hashimoto et al.
(Continued)

FOREIGN PATENT DOCUMENTS

CA    1153028 A    8/1983
CN    103153821 A   6/2013
(Continued)

OTHER PUBLICATIONS

Office Action in the counterpart Chinese Application No. 202080067092. 9, mailed May 6, 2023 (18 pages).
(Continued)

*Primary Examiner* — Thomas Randazzo
(74) *Attorney, Agent, or Firm* — Baker Botts L.L.P.

(57) ABSTRACT

An automated storage and retrieval system includes a storage grid configured to store a plurality of storage containers in vertical stacks, a plurality of remotely operated vehicles, and a rail system including rails and tracks onto which the plurality of remotely operated vehicle operates. The automated storage and retrieval system includes a first area and a second area. The first area is linked to the second area for passage of one or more of the plurality of remotely operated vehicles by a vehicle pen. The vehicle pen includes an entry barrier and an exit barrier to regulate the passage of the of one or more vehicles between the first and second area. The entry and exit barriers are moveable between an open position in which passage of the one or more of the vehicles is allowed, and a closed position in which passage of the one or more vehicles is restricted. The entry and exit barriers are
(Continued)

regulated such that the entrance barrier can be opened only when the exit barrier is closed, and vice versa.

15 Claims, 8 Drawing Sheets

(51) Int. Cl.
  *B65G 1/04*   (2006.01)
  *B65G 1/06*   (2006.01)
  *B65G 1/137*  (2006.01)
  *A62C 2/22*   (2006.01)
(52) U.S. Cl.
  CPC ......... *B65G 1/0464* (2013.01); *B65G 1/0471* (2013.01); *B65G 1/0485* (2013.01); *B65G 1/06* (2013.01); *B65G 1/065* (2013.01); *B65G 1/1375* (2013.01); *A62C 2/22* (2013.01)
(58) Field of Classification Search
  CPC .................. B65G 1/1375; B65G 47/8884; B65G 1/0478; B65G 1/0492; B65G 1/1378; B65G 2201/0235; A62C 2/22; A62C 3/002; G06Q 10/08
  See application file for complete search history.

(56) References Cited

U.S. PATENT DOCUMENTS

| | | | |
|---|---|---|---|
| 5,259,723 | A | 11/1993 | Willis et al. |
| 2008/0187412 | A1 | 8/2008 | Sturm et al. |
| 2016/0082297 | A1 | 3/2016 | Eberlein |
| 2017/0157439 | A1 | 6/2017 | Stehr |
| 2017/0173373 | A1 | 6/2017 | Wagner et al. |
| 2019/0062064 | A1* | 2/2019 | Ogawa ..................... A62C 3/14 |

FOREIGN PATENT DOCUMENTS

| | | |
|---|---|---|
| CN | 106743539 A | 5/2017 |
| CN | 206367768 U | 8/2017 |
| CN | 109969667 A | 7/2019 |
| CN | 110065751 A | 7/2019 |
| CN | 106429151 B | 11/2019 |
| CN | 109178835 B | 10/2020 |
| DE | 3118769 A1 | 12/1982 |
| DE | 3916333 A1 | 11/1990 |
| DE | 4432346 C1 | 11/1995 |
| DE | 102008014446 A1 | 9/2009 |
| DE | 102008015523 A1 | 10/2009 |
| DE | 102015222509 A1 | 5/2017 |
| EP | 0287912 A1 | 10/1988 |
| EP | 3449979 A1 | 3/2019 |
| IN | 106660703 A | 5/2017 |
| JP | S60201411 A | 10/1985 |
| JP | 0780678 B2 | 8/1995 |
| JP | 2017138692 A | 8/2017 |
| JP | 2018514667 A | 6/2018 |
| JP | 2018516070 A | 6/2018 |
| KR | 101754945 B1 | 7/2017 |
| NO | 317366 B1 | 10/2004 |
| WO | 2014075937 A1 | 5/2014 |
| WO | 2014090684 A1 | 6/2014 |
| WO | WO-2015193278 A1 * | 12/2015 ............ B25J 11/008 |
| WO | 2016166294 A1 | 10/2016 |
| WO | 2016198467 A1 | 12/2016 |
| WO | 2018146304 A1 | 8/2018 |
| WO | 2019086237 A1 | 5/2019 |

OTHER PUBLICATIONS

Wagner Group "Robot-supported Autostore warehouse: Compact design places great demands on fire prevention" WagnerImpulse, The Wagner Group Customer magazine; Mar. 2018 (16 pages).
Office Action issued in the counterpart Chinese Patent Application No. 2020800673128, mailed on Feb. 10, 2023 (11 pages).
Search Report issued in Norwegian Application No. 20191158; Dated Apr. 16, 2020 (2 pages).
Search Report issued in Norwegian Application No. 20200762; Dated Jan. 27, 2021 (3 pages).
International Search Report issued in International Application No. PCT/EP2020/076301, mailed Jan. 28, 2021 (4 pages).
Written Opinion issued in International Application No. PCT/EP2020/076301; Dated Jan. 28, 2021 (6 pages).
International Preliminary Report on Patentability issued in International Application No. PCT/EP2020/076301; mailed Jul. 29, 2021 (7 pages).
Otsuka, Takako, Notice of Reasons for Rejection for Japanese Patent Application No. JP2022518727, dated Sep. 3, 2024, 9 pages, pub. by the JPO.
Han Yingying, Decision of Rejection in counterpart Chinese Application No. 202080067092.9, China Intellectual Property Administration, mailed Apr. 27, 2024, 14 pages (with translation).
Han Yingying, Notification of Third Office Action for Chinese Patent Application No. 2020800670929, dated Nov. 2, 2024, 10 pages, pub. by the National Intellectual Property Adminstration, PRC.
Takako Ohtsuka, Notice of Reasons for Rejection for Japanese Patent Application No. 2022-518727 mailed Mar. 3, 2024, 14 pages, pub. by the JPO.

* cited by examiner

AUTOMATED STORAGE AND RETRIEVAL SYSTEM WITH A VEHICLE PEN

The present invention relates to an automated storage and retrieval system comprises a first area and a second area, wherein the first area is linked to the second area for passage of one or more of the plurality of remotely operated vehicles by a vehicle pen comprising an entry barrier and an exit barrier to regulate the passage of the one or more vehicles between the first and second area.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

The automated storage and retrieval system may comprise a separate area comprising rails and tracks and connected to the storage area such that the remotely operated vehicle may move between the areas. The areas may be separated by separation walls or fences. The separate area may for example be a service area where vehicles are placed for maintenance and service performed by human service personals or a picking area where items stored in the storage container may be accessed by a human or robotic operator.

The objective of the present invention is to provide a safety arrangement for workers and equipment of an automated storage and retrieval grid when remotely operated vehicles are moving between different areas of the automated storage and retrieval system.

An objective of the present invention is to prevent a remotely operated vehicle to move uncontrolled from one rail system to another.

SUMMARY OF THE INVENTION

The invention is directed to an automated storage and retrieval system comprising a storage grid configured to store a plurality of storage containers in vertical stacks, a plurality of remotely operated vehicles and a rail system comprising rails and tracks onto which the plurality of remotely operated vehicle operates.

The automated storage and retrieval system comprises a first area and a second area, wherein the first area is linked to the second area for passage of one or more of the plurality of remotely operated vehicles by a vehicle pen comprising an entry barrier and an exit barrier to regulate the passage of the of one or more vehicles between the first and second area.

The entry and exit barrier are moveable between an open position in which it allows passage of the one or more of the vehicles, and a closed position in which it restricts passage of the one or more vehicles, and wherein the entry and exit barriers are regulated such that the entry barrier can be opened only when the exit barrier is closed, and vice versa.

A remotely operated vehicle may be a container handling vehicle or a delivery vehicle for transport of containers. The remotely operated vehicle may operate on rails at different levels of the automated storage and retrieval grid.

The first area may be a storage and retrieval area comprising a rail system located on top of a storage grid onto which the container handling vehicles operates, and the second area may be a service area comprising a service rail system connected to the first area, such that a remotely operated vehicle (container handling vehicle) may move on the rail system between the first and second area.

The first area may be a delivery area comprising a delivery rail system onto which a plurality of delivery vehicles operates to transport storage container between the storage grid and a container accessing station. The delivery area may be located at a lower floor of a storage and retrieval grid structure. The second area may be a service area comprising service rail system connected to the delivery rail system, or the second area may be a container accessing area comprising a container access rail system connected to the delivery rail system.

The first and second area may also include other areas of an automated storage and retrieval system. An area may be a location of the automated storage and retrieval system dedicated for a certain purpose; such as a service area, main grid area, delivery rail area, production area, transport area, parking area, charging area, etc.

The vehicle pen is arranged for passage of the one or more remotely operated vehicle between the first and second areas. The vehicle pen comprises one or more entry barriers and one or more exit barriers to regulate the passage of the of one or more vehicles between the first and second area.

The entry and exit barriers of the vehicle pen may comprise one or more physical barriers arranged to regulate the passage of the one or more vehicles through the vehicle pen.

The physical barriers may be at least any one of a bar, wall, gate, port, door, enclosure or structure.

The terms "entry barrier" and "exit barrier" have been used to describe the barriers in one direction of travel. The vehicles may, of course, also return through the vehicle pen back to their original area, during which they will pass through the exit barrier and then the entry barrier in the reverse order. Thus, the vehicle pen may be used for two-way traffic.

The one or more physical barriers may comprise one or more moveable barriers arranged on the rail system and moveable relative to the rail system. The moveable barriers may be adapted to close off an entry or exit opening of the vehicle pen, and moveable between a closed position in which the moveable barrier restricts passage of the one or more vehicle into or out of the vehicle pen through the opening, and an open position in which the moveable barrier allows passage of the one or more vehicles into or out of the vehicle pen through the opening.

The one or more moveable barriers may be connected to the rail system such that it may slide, pivot or be lifted/lowered relative to the rails system, between the open position and the closed position.

The one or more moveable barriers may be a: port, bar, structure, door, enclosure, band. Loop, restraint, panel, stop, etc., or a combination thereof.

The one or more moveable barriers may be arranged on a service vehicle or on a remotely operated vehicle moving on the rail system. Thus, the vehicle pen may comprise a service vehicle or a remotely operated vehicle where the entry barrier and/or the exit barrier are fully or partially integrated on the vehicle. More specific, the moveable barriers of the entry and/or exit barriers may be arranged on the service vehicle or the remotely operated vehicle.

The moveable barrier may be arranged on a chassis of the service vehicle and/or the remotely operated vehicle and may be moveable relative to the chassis of the vehicle. The moveable barrier may be at least any one of a: bar, port, structure, door, etc. The moveable barrier may be slid, lifted, lowered, tilted or pivoted relative to the vehicle between the open position and the closed position.

The moveable barrier may also comprise the remotely operated vehicle itself.

The rail system of the automated storage and retrieval may extend over the first and second areas. The rail system may comprise a plurality of first rails arranged in a first direction (X) and second rails arranged in a second direction (Y), the rails each comprising parallel tracks arranged in a horizontal plane (P), which parallel tracks form a grid pattern of grid cells in the horizontal plane (P). The one or more remotely operated may move the tracks of the rail system between the first and second area.

The horizontal plane (P) may be a container handling vehicle rail plane (Pa) on top of a storage and retrieval grid and/or the horizontal plane (P) may be a delivery rail plane ($P_L$) located at the lower part of a storage and retrieval grid.

The first area and the second area may be separated by a partition comprising an opening allowing at least one of the plurality of remotely operated vehicles to pass through, and a gate configured to open and close the opening, wherein the gate may constitute the entry barrier or the exit barrier of the vehicle pen.

The partition may be a physical barrier arranged for separating the areas. The partition may be a wall or a fence or a combination thereof.

When moving from the first area into the second area, the movable barrier of the entry barrier may be a bar arranged on the rail system of the first area and the movable barrier of the second area may be the gate arranged to close off the opening of the partition. The gate may be arranged on the rail system or on the partition. The vehicle enters the vehicle pen through the open bar at the entry barrier. When the vehicle is inside the vehicle pen, the bar of the entry barrier closes. The exit barrier may be opened only once the entry barrier is closed. Thus, when the system registers that the entry barrier is closed the system allows the exit barrier to be opened. The gate of the exit barrier opens and the vehicle is allowed to pass the vehicle pen and enter into the second area. The system works in an opposite direction too when the vehicle moves from the second area to the first area. In this case, the gate opens and allow passage of the vehicle into the vehicle pen. The gate closes when the vehicle is inside the vehicle pen. The system registers that the gate is closed and opens the bar, allowing the vehicle to move out from the vehicle pen and into the first area.

The vehicle pen may also be arranged on the second area side, such that it may protect service people working in the second area (i.e. in a service area) when the remotely operated vehicle is moving from the first area into the second area. In this case, the moveable barrier may be arranged on the rail system located in the second area. The gate may be the entry barrier and the moveable barrier may be the exit barrier.

The vehicle pen may comprise an intermediate area located between the first area and the second area and wherein the first, second and intermediate areas are separated by partitions comprising an opening closeable by the moveable barrier of the entry barrier or the exit barrier.

The areas may be separate by partitions such that there is a first partition between the first area and the intermediate area, and a second partition between the intermediate area and the second area. The partitions may comprise a first opening with a first gate and a second opening with a second gate.

When a vehicle is moving from the first area to the second area, the first gate may be the entry barrier of the vehicle pen and the second gate may be the exit barrier. The first gate opens and allows the vehicle to pass through the first opening and into the intermediate area which defines the vehicle pen. The first gate closes and the system allows the second gate to be opened. The second gate opens and allows the vehicle to enter into the second area through the second opening.

The system works analogously when the vehicle is moving from the second area to the first area. In this case the second gate will constitute the entry barrier and the first gate will constitute the exit barrier of the vehicle pen.

The intermediate area may comprise a vehicle shutdown zone, which upon activation automatically shuts down the power of the one or more vehicles located in the vehicle shutdown zone.

The shutdown zone may comprise one or more grid cells of the rail system located in the intermediate area.

The activation of the shutdown zone is regulated with the opening of the entry or exit barrier, such that vehicles located in the shutdown zone are automatically shut down in the event the entry or exit barriers are opened.

In embodiment, one or more grid cells located in the intermediate area may be defined as a shutdown zone, more preferably the entire intermediate area may be the shutdown zone. Thus, the system may be operated such that the power of the one or more vehicle located in the shutdown zone are shut down automatically when the second gate opens, and such that the vehicles located in the shutdown zone can be retrieved by a human operator though the second opening. The human operator may thus enter the intermediate area (vehicle pen) to retrieve a vehicle without the risk of being accidentally hit by the vehicle moving unintentionally.

A sensor may be arranged to register the position of the moveable barrier of the entry and exit barriers and to communicate with an automated control system for regulating the moveable barriers.

The sensor may communicate with the automated control system for regulating the locking or closing when the barrier is open and unlocking or opening when the barrier is closed.

The sensor may be located on the rail system or on the partition adjacent the moveable barrier of the entry and exit barrier. The sensors may be optical sensors detecting reflection of lights. Other or additional sensors for detecting the moveable gate may also be used, e.g. acoustic sensors. A sensor having a narrow beam may be advantageous for the signal it will need to output in order to provide a stronger peak/trough-signal.

The moveable barriers of the entry and exit barriers may be configured to be remotely locked, unlocked, opened or closed by use of the automated control system.

Some systems require the moveable barrier to be opened manually, i.e. a service area gate (moveable barrier) towards a service area. In this case, the automated control system unlocks the service area gate once the entry barrier is closed. The gate may then be opened manually by service personnel which opens the service area gate to retrieve the vehicle. The vehicle may be shut down by the control system prior to the service personnel moving into the vehicle pen.

The moveable gate may also be opened automatically, i.e. the main grid area gate located between a storage grid area and the intermediate area may be an automatic openable and closeable gate. When the automated control system registers that the entry barrier is closed, the main grid area gate may be opened automatically and the vehicle may move into the storage grid area.

The invention is also directed to a method of moving at least one of a plurality of remotely operated vehicles between a first area and a second area of an automated storage and retrieval system. The system comprises a first area and a second area, wherein the first area is linked to the second area for passage of one or more of the plurality of remotely operated vehicles by a vehicle pen comprising an entry barrier and an exit barrier to regulate the passage of the of one or more vehicles between the first and second area.

The entry and exit barrier are moveable between an open position in which it allows passage of the one or more of the vehicles, and a closed position in which it restricts passage of the one or more vehicles, and wherein the entry and exit barriers are regulated such that the entry barrier can be opened only when the exit barrier is closed, and vice versa.

The operation of the remotely operated vehicles, together with the opening, unlocking, closing and locking of the entry and exit barriers may be executed by an automated control system comprising a central computer. The central computer may be arranged to control and execute the step of:
- moving the remotely operated vehicle on the first area towards the entry barrier of the vehicle pen,
- opening the entry barrier after being confirmed that the exit barrier is closed,
- moving the at least one of the plurality of remotely operated vehicles through the entry barrier of the vehicle pen,
- closing the entry barrier while the vehicle is in the vehicle pen,
- confirming that the entry barrier is in the closed or locked position,
- unlocking or opening the exit barrier, wherein the exit barrier may be opened manually or automatically,
- moving vehicle through the exit barrier and into the second area, and
- closing the exit barrier.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
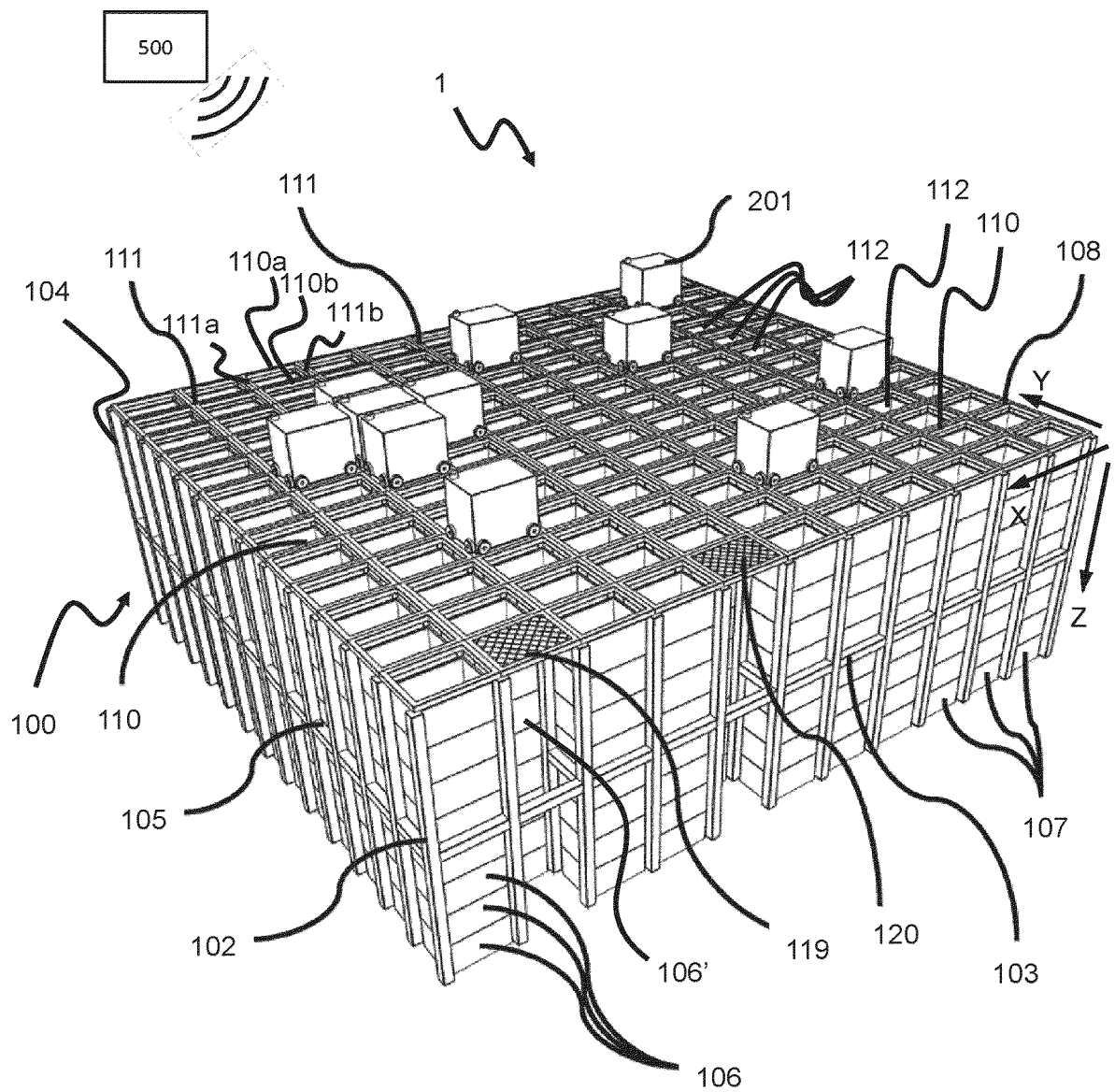
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
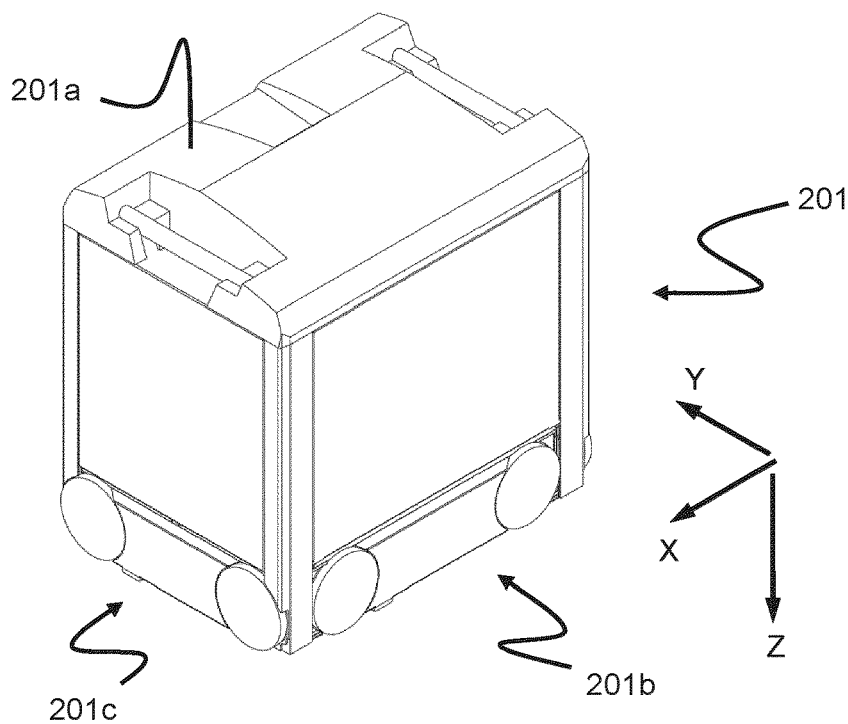
FIG. 2 is a perspective view of a prior art container handling vehicle having a centrally arranged cavity for carrying storage containers therein.
Figure 3:
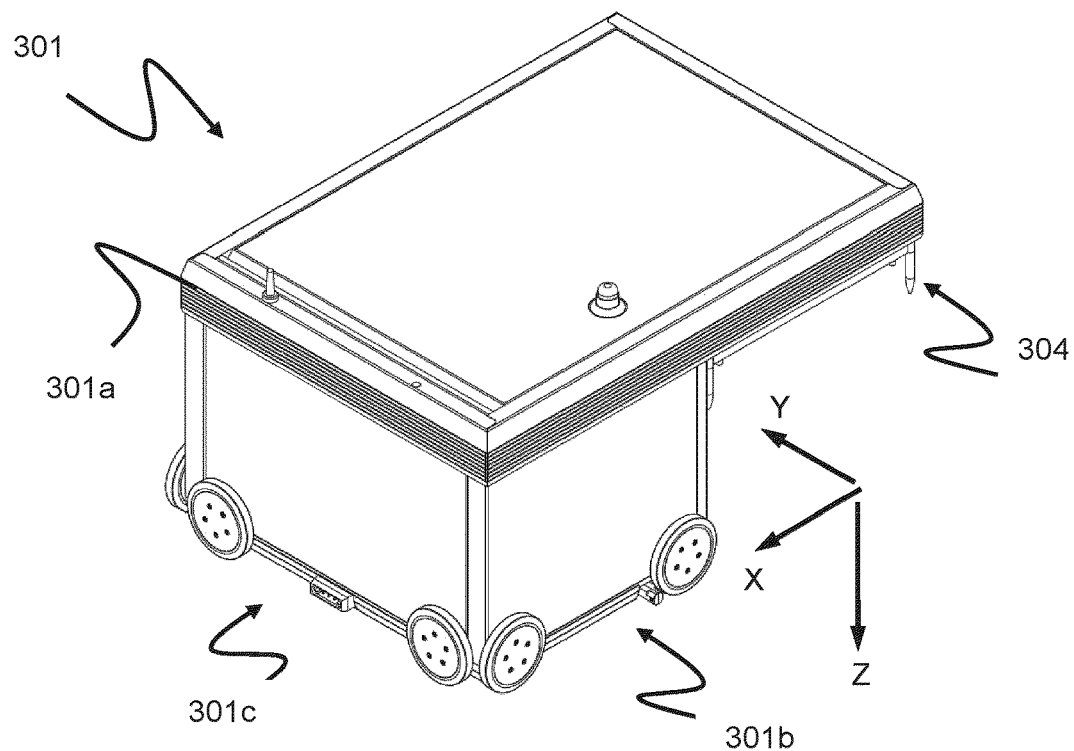
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 4-13.

Figure 4:
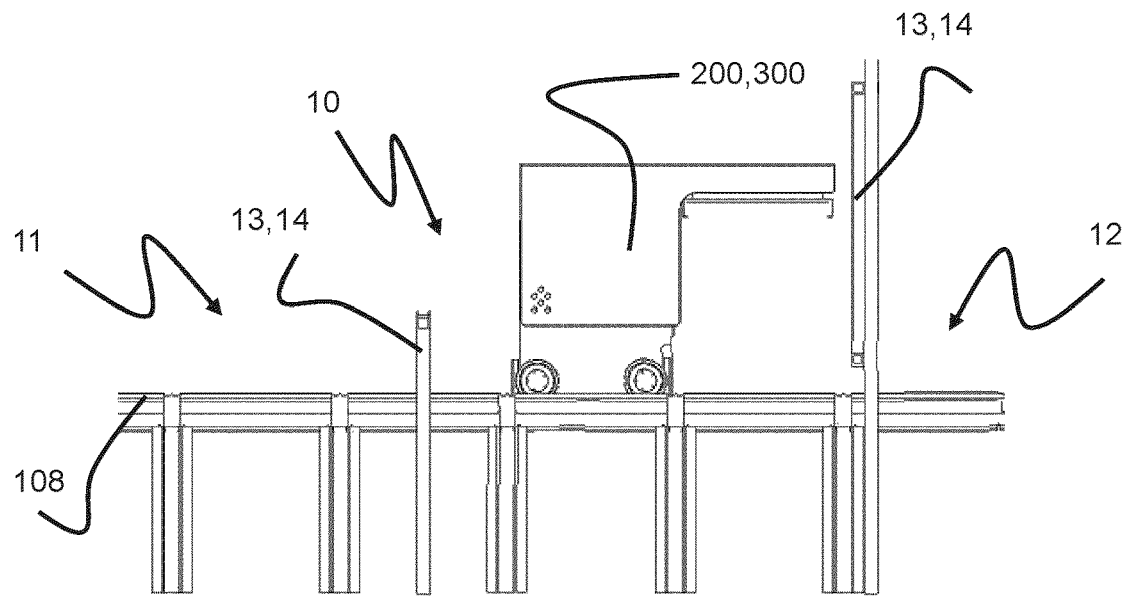
FIG. 4 is a side view of a vehicle pen arranged to regulate the passage of the of one or more vehicles between the first and second area.

FIG. 4 shows a side view of the system comprising a first area 11 and a second area 12. The first area 11 is linked to the second area 12 for passage a remotely operated vehicle 200,300 by a vehicle pen 10 comprising an entry barrier 13 and an exit barrier 14 to regulate the passage of the vehicle 200,300 between the first and second area 11,12.

The entry barrier 13 and exit barrier 14 are defined by the moving direction of the vehicle 200,300. The entry and exit barriers 13,14 are moveable between an open position in which it allows passage of the vehicle 200,300, and a closed position in which it restricts passage of the vehicle 200,300, and wherein the entry and exit barriers 13,14 are regulated such that the entry barrier 13 can be opened only when the exit barrier 14 is closed, and vice versa.

In FIG. 4, the vehicle 200,300 is located in a holding zone of the vehicle pen 10, between the entry and exit barrier 13,14. The first area 11 may be a storage grid area and the second area may be a service area where vehicles 200,300 are placed for service and maintenance. The vehicle pen 10 is located in a service area of the automated storage and retrieval system, such that it provides safety for the workers (not shown) operating in the service area. The vehicle pen 10 comprises an entry barrier which is a gate 21 and exit barrier 14 which is the moveable barrier 15, to regulate the passage of the vehicle 200,300 into the service area.

When the vehicle 200,300 is moving from the service area and into the storage grid area, the entry barrier 13 may comprise a moveable boom 15 that can be raised or lowered between the open and closed position, and the exit barrier 14 may be a closeable gate 21 arranged in an opening 18 of a partition 17 between the main grid area and the service grid area.

In addition to providing a linking part of the rail system between the two zones, the vehicle pen 10 may also be located on the first area and/or second area. Thus, the vehicle pen 10 may be located on the service area as described above, and/or it may be located on the storage grid area.

Figure 5:
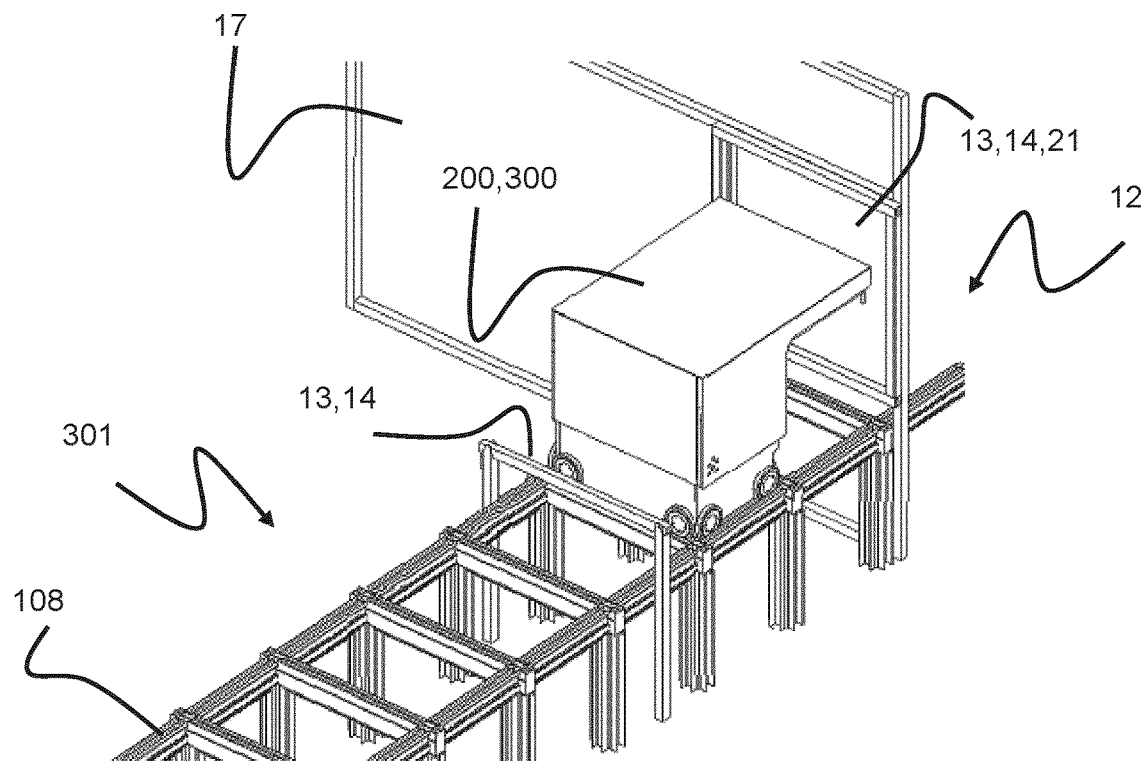
FIG. 5 is a perspective view of the embodiment in FIG. 4.

FIG. 5, shows a perspective view of the system in FIG. 4, where both entry and exit barrier 13,14 are closed.

Figure 6:
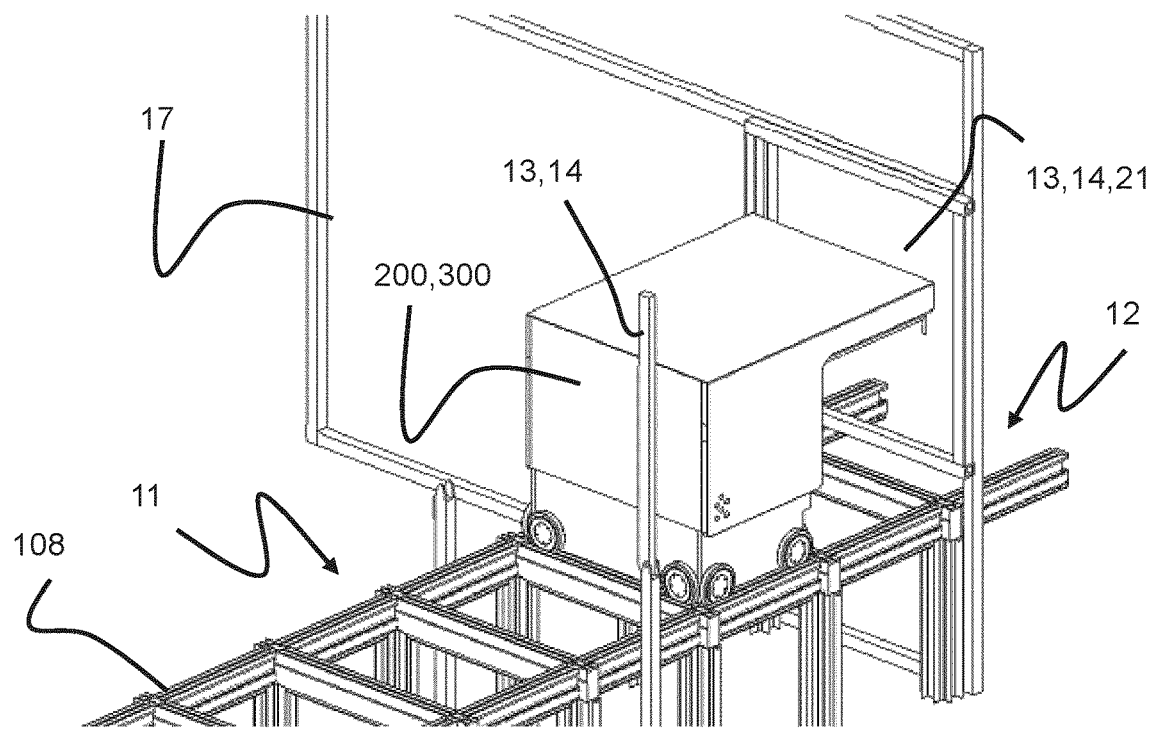
FIG. 6 is a perspective view of a vehicle pen with one of the moveable barrier of the entry or exit barrier in an open position.
Figure 7:
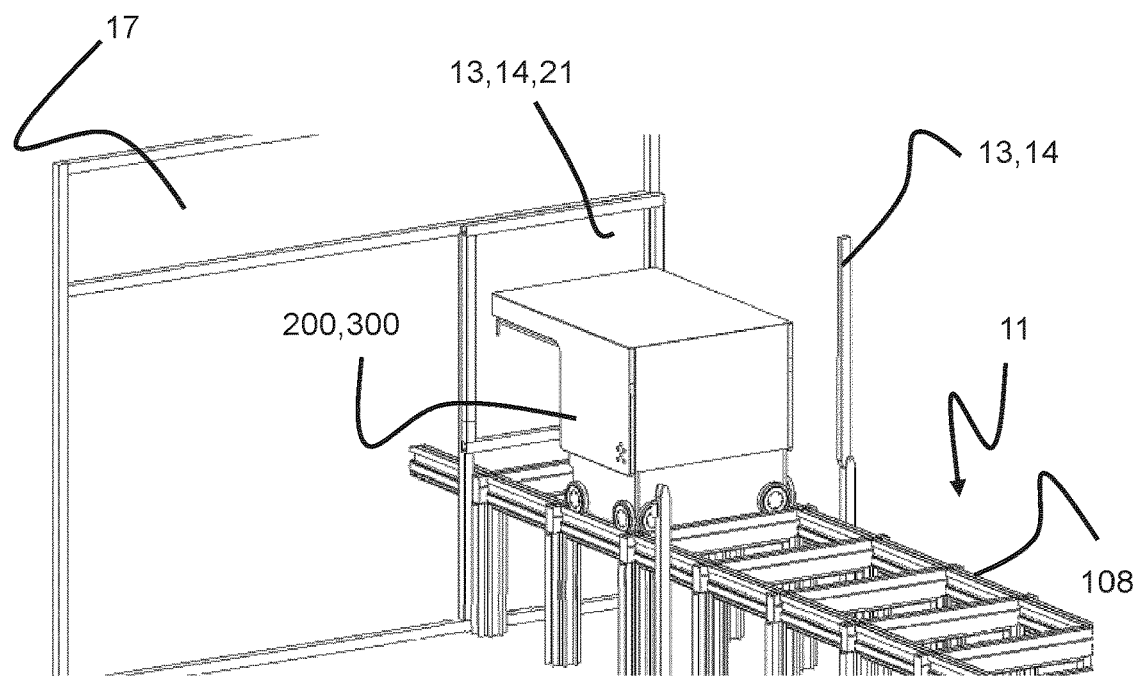
FIG. 7 is a perspective view of the embodiment in FIG. 6 from another angle.

FIGS. 6 and 7 shows the moveable boom 15 in the open position, such that the vehicle 220,300 may move from the holding zone 19 of the vehicle pen 10 and into the main grid area (first area) 11.

The entry or exit barrier 13,14 may comprise a moveable barrier 15. The moveable barrier may be at least anyone of a; bar, wall, gate, port, door, enclosure or structure. The moveable barrier 15 may be arranged on the rail system 108 and moveable relative to the rail system 108.

The first area 11 and the second area 12 may be separated by a partition 17, as shown in FIGS. 5-12. The partition 17 may comprise an opening 18 allowing the remotely operated vehicle 200,300 to pass through, and a gate 19 configured to open and close the opening 18. The gate 21 may be the entry barrier 13 or the exit barrier 14 of the vehicle pen 10. The vehicle pen 10 may be established at the first area 11 or at the second area 12.

Figure 8:
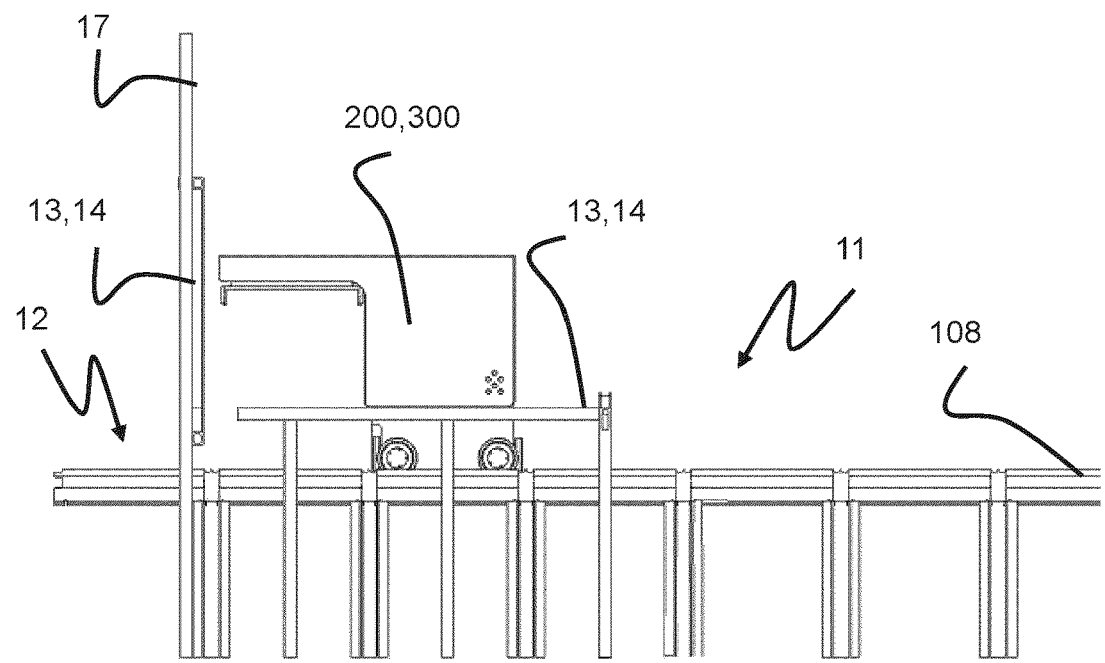
FIG. 8 is a side view of a vehicle pen comprising physical barriers.
Figure 9:
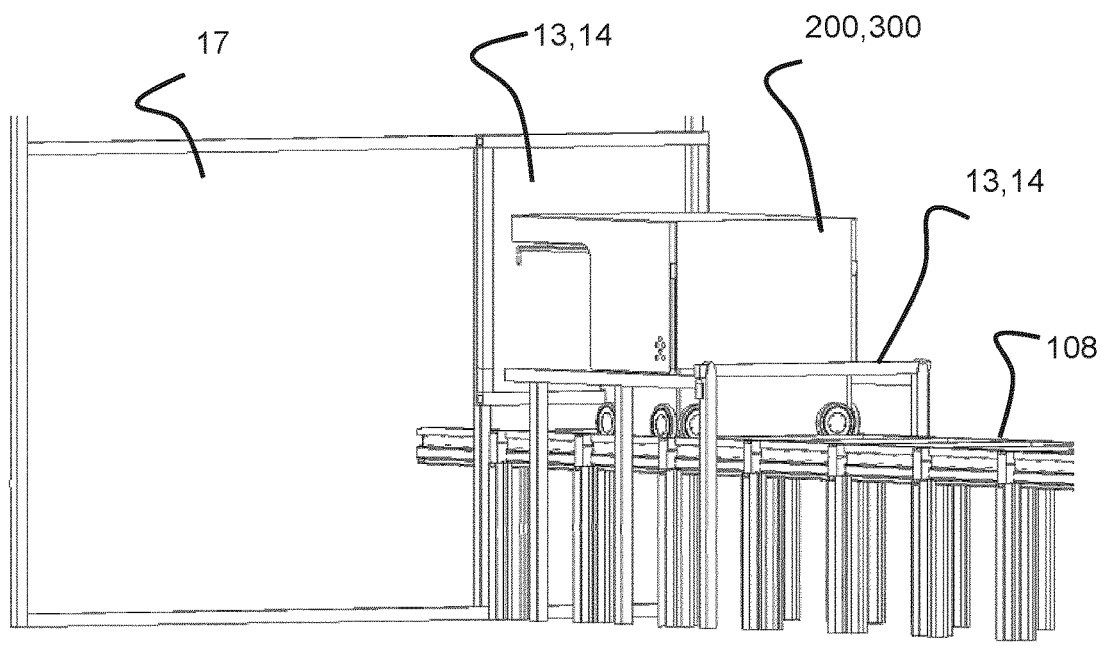
FIG. 9 is a perspective view of the embodiment in FIG. 8.

FIGS. 8 and 9 shows a vehicle pen 10 comprising a fence 22 creating the holding zone 19 of the vehicle pen 10 between the first area 11 and the second area 12. The vehicle pen 10 comprises the entry barrier 13 and exit barrier 14 that are regulated such that the entry barrier 13 can be opened only when the exit barrier 14 is closed, and vice versa.

Figure 10:
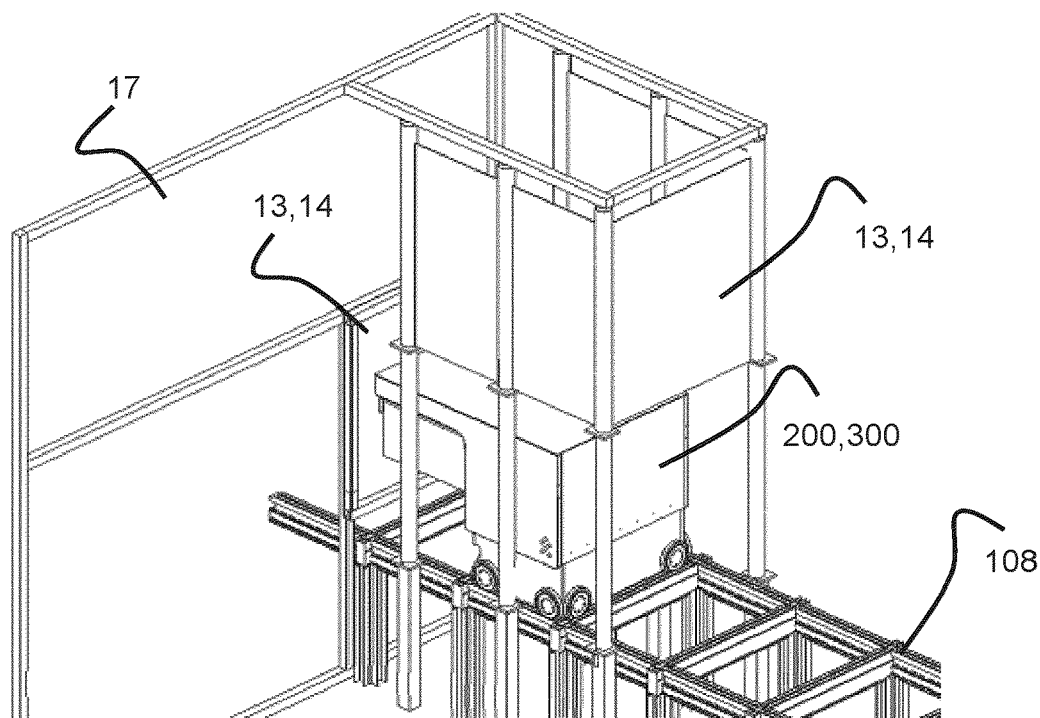
FIG. 10 is a perspective view of a vehicle pen where the moveable barrier of the entry and exit barrier is an enclosure.

FIG. 10 shows the entry or exit barrier 13,14 comprising a moveable enclosure 15, the movable enclosure 15 may be raised or lowered between the open and closed position of the entry or exit barrier 13,14.

The automated storage and retrieval system comprises a rail system 108 which extends over the first and second areas 11,12 such that the remotely operated vehicle can move between the areas 11,12 via the vehicle pen 10. The rail system 108 comprising a plurality of first rails arranged in a first direction (X) and second rails arranged in a second direction (Y), the rails each comprising tracks 110, 111 arranged in a horizontal plane (P), which tracks 110,111 form a grid pattern of grid cells in the horizontal plane (P).

Figure 11:
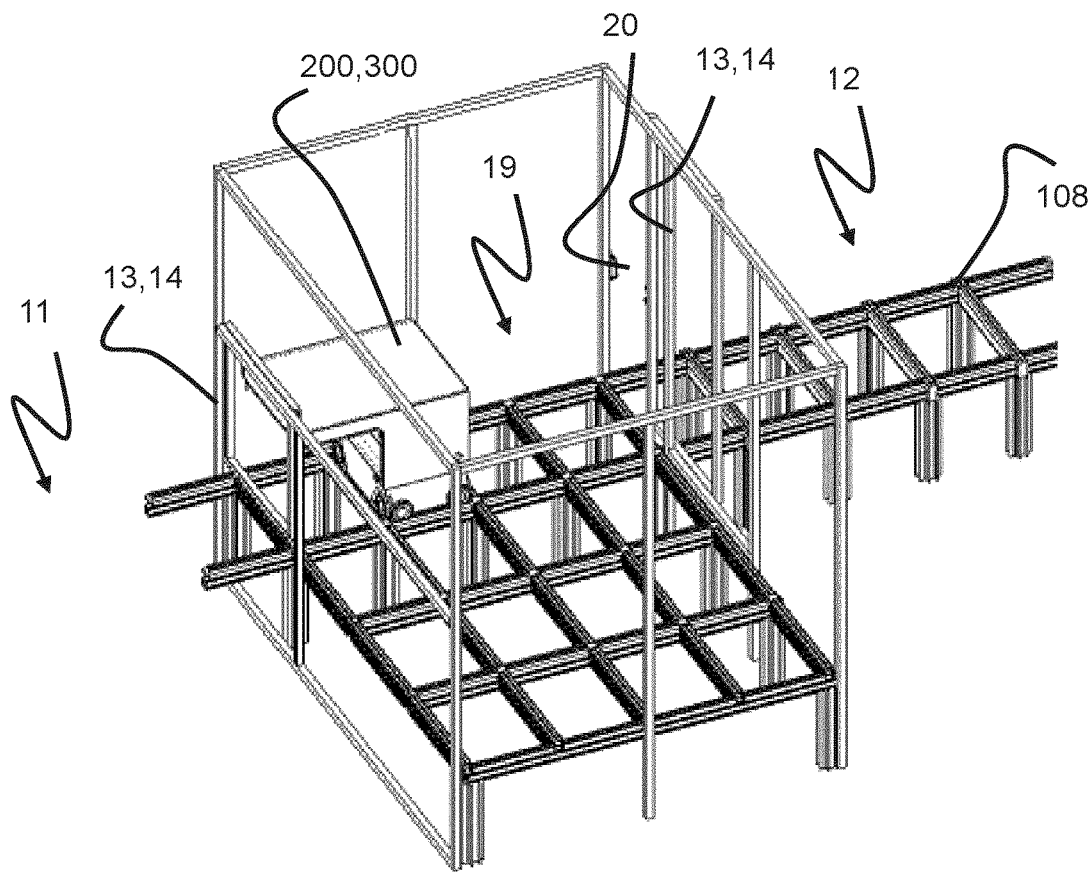
FIG. 11 is a perspective view of a vehicle pen as an intermediate area located between the first and second area.

The vehicle pen 10 provides a holding zone 19 for the one or more remotely operated vehicles 200,300 between the entry and exit barriers 13,14, the holding zone being at least one grid cell in length and/or width. FIG. 10 shows the holding zone 19 with 2 grid cells, while FIG. 11 shows the holding zone 19 with 16 grid cells. Within the scope of the invention, any number of grid cells for the holding zone may be applicable.

The holding zone 19 may also be used as a vehicle parking area or vehicle charging area.

As shown in FIGS. 10-13, the holding zone 19 may be an intermediate area 23 located between the first area and the second area 11,12 and wherein the first, second and intermediate areas 11,12,23 are separated by partitions comprising an opening closeable by the entry barrier or the exit barrier 13,14.

The intermediate area may comprise a vehicle shutdown zone, which upon activation automatically shuts down the power of the one or more vehicles 200,300 located in the vehicle shut down zone. The shutdown zone may include all grid cells in the intermediate area 23, or the shutdown zone may include one or more grid cells within the intermediate area 23.

Activation of the shutdown zone may be regulated with the opening of the entry or exit barrier 13,14, such that vehicle 200,300 located in the shutdown zone are automatically shut down in the event the entry or exit barriers 13,14 are opened.

Figure 12:
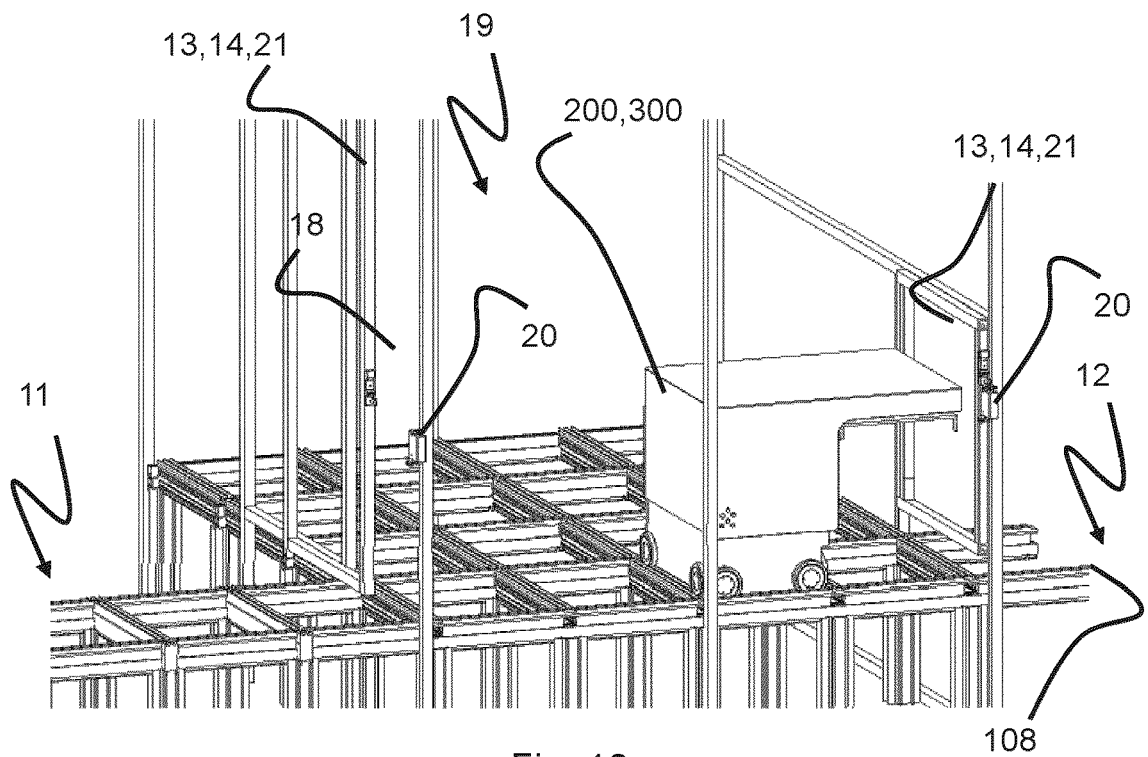
FIG. 12 is another perspective view of the embodiment in FIG. 11.
Figure 13:
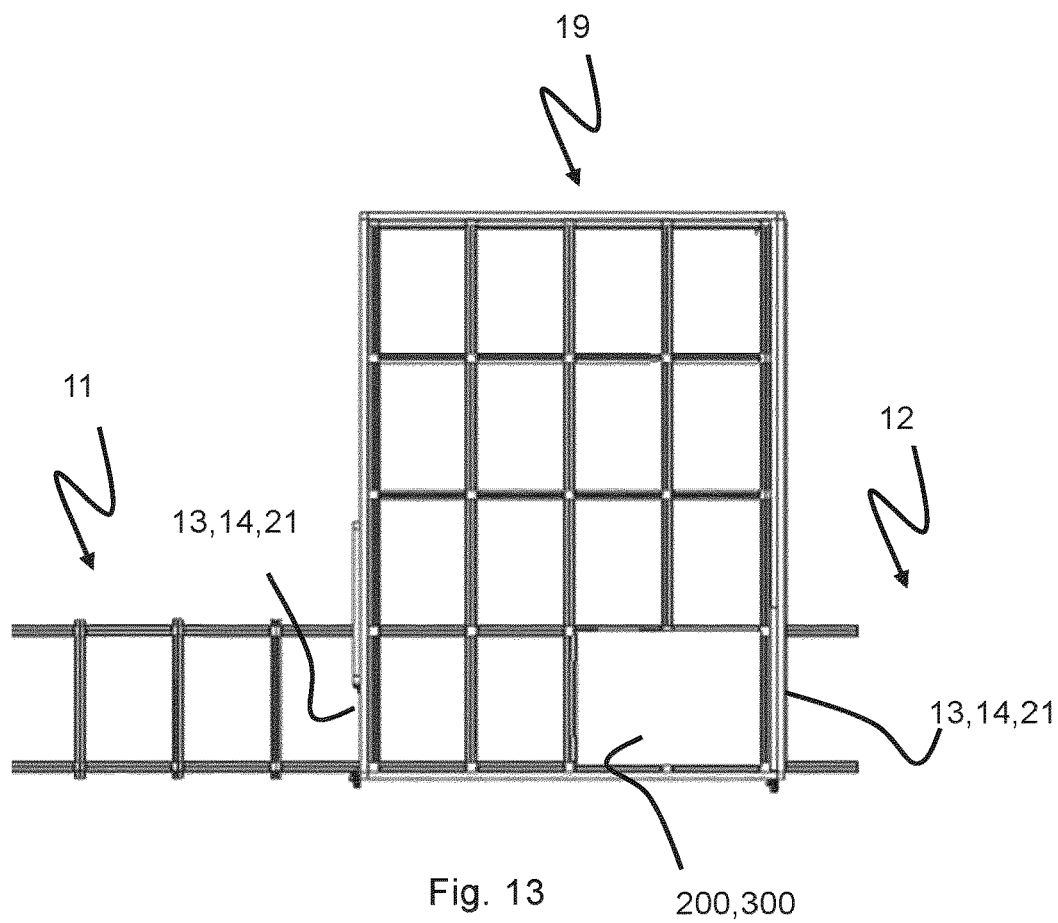
FIG. 13 is a top view of the embodiment in FIGS. 11 and 12.

FIG. 12 shows that a sensor 20 may be arranged to read and register the position of the movable barrier 15 of the entry and exit barrier 13,14. The one or more sensors 20 communicates with an automated control system (not shown) for regulating the entry and exit barriers 13,14. The entry and exit barriers 13,14 may be configured to be remotely locked, unlocked, opened or closed by use of the automated control system.

Figure 14:
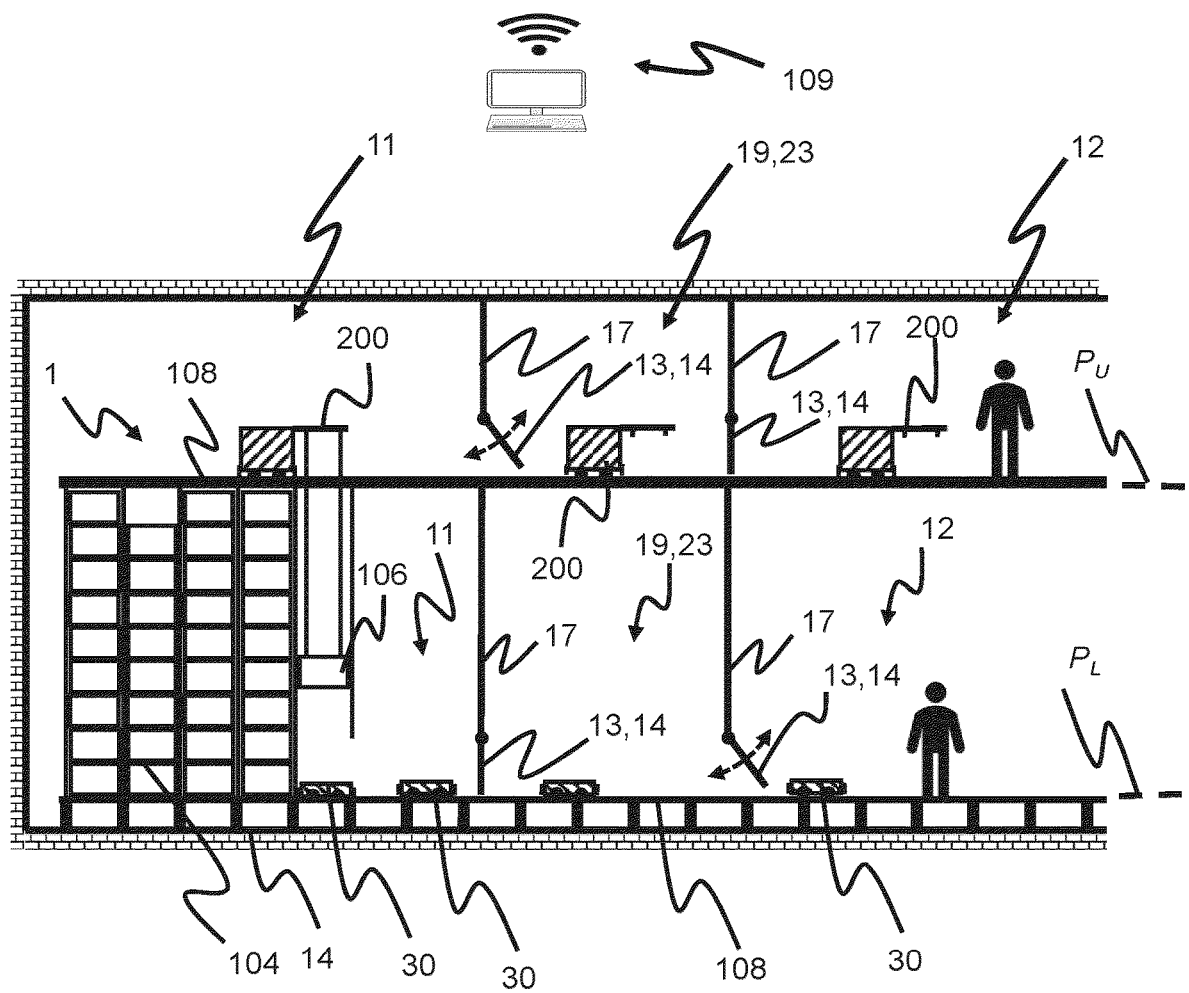
FIG. 14 is a side view of an automated storage and retrieval system.

FIG. 14 shows a side view of an automated storage and retrieval system comprising a container handling vehicle rail system onto which the container handling vehicles 200,300 operates, and a delivery rail system onto which the delivery vehicles 30 operates.

The first area 11 may be a storage and retrieval area comprising a rail system located on top of a storage grid, and the second area 12 may be a service area comprising a service rail system connected to the first area, such that a container handling vehicle 200,300 may move on the rail system between the first and second area 11,12.

The first area 11 may be a delivery area comprising a delivery rail system onto which a plurality of delivery vehicles 30 operates to transport storage container 106 between the storage grid and a container accessing station. The delivery area may be located at the bottom floor of a storage and retrieval grid structure. The second area may be a service area comprising service rail system connected to the delivery rail system, or the second area may be a container accessing area comprising a container access rail system connected to the delivery rail system.

The vehicle pen may be located on a container handling vehicle rail plane ($P_u$) on top of a storage and retrieval grid and/or the vehicle pen may be located at a horizontal delivery rail plane ($P_L$) located at the lower part of a storage and retrieval grid.

The first area 11 is linked to the second area for passage of one or more of the plurality of remotely operated vehicles 200,300,30 by the vehicle pen 10 comprising an entry barrier 13 and an exit barrier 14 to regulate the passage of the one or more vehicles 200,300 between the first and second area 11,12, and wherein the entry and exit barrier 13,14 are moveable between an open position in which it allows passage of the one or more of the vehicles 200,300,30 and a closed position in which it restricts passage of the one or more vehicles 200,300,30 and wherein the entry and exit barriers 13,14 are regulated such that the entry barrier 13 can be opened only when the exit barrier 14 is closed, and vice versa.

The first area and the second area may be separated by a partition 17 comprising an opening 18 allowing at least one of the plurality of remotely operated vehicles 200,300,30 to pass through, and a gate 21 configured to open and close the opening 20, wherein the gate 21 may constitute the entry barrier 13 or the exit barrier of the vehicle pen 10.

The entry and exit barriers 13,14 are moveable between an open position in which it allows passage of the one or more of the vehicles 200,300,30 and a closed position in which it restricts passage of the one or more vehicles 200,300,30 and wherein the entry and exit barriers 13,14 are regulated such that the entry barrier 13 can be opened only when the exit barrier 14 is closed, and vice versa.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)

304 Gripping device
500 Control system
X First direction
Y Second direction
Z Third direction
10 Vehicle Pen
11 First area
12 Second area
13 Entry barrier
14 Exit barrier
15 Moveable barrier
17 Partition
18 Opening
19 Holding zone
20 Sensor
21 Gate/Door
22 Fence
23 Intermediate area
109 Central computer system

The invention claimed is:

1. An automated storage and retrieval system comprising a storage grid configured to store a plurality of storage containers in vertical stacks, a plurality of remotely operated vehicles, and a rail system comprising rails and tracks onto which the plurality of remotely operated vehicles operate,
wherein the automated storage and retrieval system comprises a first area and a second area, wherein the first area is linked to the second area for passage of one or more vehicles of the plurality of remotely operated vehicles by a vehicle pen comprising an entry barrier and an exit barrier to regulate the passage of the one or more vehicles between the first area and the second area, and
wherein the entry and exit barriers are moveable between an open position in which passage of the one or more vehicles is allowed, and a closed position in which passage of the one or more vehicles is restricted, and wherein the entry and exit barriers are regulated such that the entry barrier can be opened only when the exit barrier is closed, and vice versa.

2. The automated storage and retrieval system according to claim 1, wherein the first area and the second area are separated by a partition comprising an opening allowing at least one of the plurality of remotely operated vehicles to pass through, and a gate configured to open and close the opening, wherein the gate is the entry barrier or the exit barrier of the vehicle pen.

3. The automated storage and retrieval system according to claim 1, wherein the first area is a rail system area located above a storage grid and the second area is a service rail system area where one or more vehicles are located for maintenance and service.

4. The automated storage and retrieval system according to claim 1, wherein the first area is a delivery rail system area located below a storage grid or on a floor level of a storage grid and the second area is an access rail area where items stored in storage containers transported on remotely operated vehicles are accessed by a human or robotic operator.

5. The automated storage and retrieval system according to claim 1, wherein a sensor is arranged to register the position of the entry and exit barriers and communicate with an automated control system for regulating the entry and exit barriers.

6. The automated storage and retrieval system according to claim 5, wherein the entry and exit barriers are configured to be remotely locked, unlocked, opened or closed by use of the automated control system.

7. The automated storage and retrieval system according to claim 1, wherein the entry and exit barriers of the vehicle pen comprise one or more moveable barriers, each moveable between the open position and the closed position.

8. The automated storage and retrieval system according to claim 7, wherein the one or more moveable barriers comprise at least one of a: bar, wall, gate, port, door, enclosure, or structure.

9. The automated storage and retrieval system according to claim 7, wherein the one or more moveable barriers are arranged on the rail system and moveable relative to the rail system.

10. The automated storage and retrieval system according to claim 1, wherein the rail system extends over the first and second areas, the rail system comprising a plurality of first rails arranged in a first direction and second rails arranged in a second direction, the rails each comprising tracks arranged in a horizontal plane, which tracks form a grid pattern of grid cells in the horizontal plane.

11. The automated storage and retrieval system according to claim 10, wherein the vehicle pen provides a holding zone for one or more remotely operated vehicles between the entry barrier and the exit barrier that is one or more grid cells in lengths and/or width.

12. The automated storage and retrieval system according to claim 11, wherein the holding zone is an intermediate area located between the first area and the second area and wherein the first, second and intermediate areas are separated by partitions comprising an opening closeable by the entry barrier or the exit barrier.

13. The automated storage and retrieval system according to claim 12, wherein the intermediate area comprises a vehicle shut down zone, which upon activation automatically shuts down the power of the one or more vehicles located in the vehicle shut down zone.

14. The automated storage and retrieval system according to claim 13, wherein the activation of the vehicle shut down zone is regulated with the opening of the entry barrier or the exit barrier, such that vehicles located in the vehicle shut down zone are automatically shut down in an event the entry barrier or the exit barrier is opened.

15. A computer-implemented method of moving at least one of a plurality of remotely operated vehicles between a first area and a second area of an automated storage and retrieval system, the automated storage and retrieval system comprising a storage grid configured to store a plurality of storage containers in vertical stacks, the plurality of remotely operated vehicles, and a rail system comprising rails and tracks onto which the plurality of remotely operated vehicles operate, wherein the automated storage and retrieval system comprises the first area and the second area, wherein the first area is linked to the second area for passage of one or more vehicles of the plurality of remotely operated vehicles by a vehicle pen comprising an entry barrier and an exit barrier to regulate the passage of the one or more vehicles between the first area and the second area, wherein the entry and the exit barriers are moveable between an open position in which passage of the one or more of the vehicles is allowed, and a closed position in which passage of the one or more vehicles is restricted, wherein the entry and exit barriers are regulated such that the entry barrier can be opened only when the exit barrier is closed, and vice versa, and wherein the computer-implemented method comprises:
moving the at least one of the plurality of remotely operated vehicles on the first area towards the entry barrier of the vehicle pen, opening the entry barrier after being confirmed that the exit barrier is closed, moving the at least one of the plurality of remotely operated vehicles through the entry barrier of the vehicle pen, closing the entry barrier while the vehicle is in the vehicle pen, confirming that the entry barrier is in the closed position, unlocking or opening the exit barrier, wherein the exit barrier may be opened manually or automatically, moving vehicle through the exit barrier and into the second area, and closing the exit barrier.

* * * * *